United States Patent
Wang et al.

(10) Patent No.: US 11,572,783 B1
(45) Date of Patent: Feb. 7, 2023

(54) SIGNAL TRANSMISSION METHOD, DEVICE AND EQUIPMENT BASED ON DRILLING EQUIPMENT, AND MEDIUM

(71) Applicant: INSTITUTE OF GEOLOGY AND GEOPHYSICS, CHINESE ACADEMY OF SCIENCES, Beijing (CN)

(72) Inventors: Jingjing Wang, Beijing (CN); Yongyou Yang, Beijing (CN); Qijun Xie, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/855,463

(22) Filed: Jun. 30, 2022

(30) Foreign Application Priority Data

Apr. 11, 2022 (CN) .......................... 202210372212.7

(51) Int. Cl.
*G06F 13/40* (2006.01)
*E21B 47/12* (2012.01)

(52) U.S. Cl.
CPC ............ *E21B 47/12* (2013.01); *G06F 13/409* (2013.01)

(58) Field of Classification Search
CPC ............................... E21B 47/12; G06F 13/409
USPC ...................................................... 340/853.1
See application file for complete search history.

(56) References Cited

U.S. PATENT DOCUMENTS

| | | | |
|---|---|---|---|
| 6,426,947 B1 * | 7/2002 | Banker | H04L 41/12 370/254 |
| 7,917,495 B1 * | 3/2011 | Chapman | G06F 16/24532 707/718 |
| 2012/0084378 A1 * | 4/2012 | Kaneko | G06F 15/16 709/208 |
| 2012/0137034 A1 * | 5/2012 | Kaneko | G06F 13/4286 710/110 |
| 2020/0192846 A1 * | 6/2020 | Evans | H04L 12/403 |

FOREIGN PATENT DOCUMENTS

| | | |
|---|---|---|
| CN | 103883315 A | 6/2014 |
| CN | 114650103 A | 6/2022 |

* cited by examiner

*Primary Examiner* — Don N Vo
(74) *Attorney, Agent, or Firm* — Birch, Stewart, Kolasch & Birch, LLP (57) ABSTRACT

Disclosed are a signal transmission method, device and equipment based on drilling equipment, and a medium, the signal transmission is applied to a signal transmission system of the drilling equipment, the signal transmission system includes a master node and a plurality of slave nodes, and the master node communicates with the slave nodes through a 1-wire bus. The signal transmission method includes: sending, by the master node, an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time; and receiving, by the specified slave node, the instruction signal, decoupling the instruction signal to obtain the data request signal, obtaining a reply signal according to the data request signal, coupling the reply signal with the TTL signal to obtain a feedback signal, and sending the feedback signal to the master node.

10 Claims, 4 Drawing Sheets

SIGNAL TRANSMISSION METHOD, DEVICE AND EQUIPMENT BASED ON DRILLING EQUIPMENT, AND MEDIUM

FIELD

Embodiments of the present disclosure belong to the technical field of signal transmission, and particularly relate to a signal transmission method, device and equipment based on drilling equipment, and a medium.

BACKGROUND

When drilling equipment is used, each node not only needs to identify a TTL signal, but also needs to transmit a data request signal in real time. Most of the existing solutions are that the signal is respectively transmitted through multiple signal lines, in drilling equipment, electrical connection between the equipment can only depend on a conductive slip ring, a process of arranging multiple signal lines on a conductive slip ring may greatly increase the cost, meanwhile, the multiple signal lines need through holes, so that the cost of punching through holes is high, and in addition, the strength of a drill collar may be affected by excessive through holes, and a drill pipe instrument cannot bear the downhole high-pressure environment due to increase of the number of drill holes.

Therefore, in the prior art, the signal transmission by drilling equipment through multiple signal lines has the problems that the cost is high, and the pressure bearing capacity of a drill pipe instrument is reduced.

SUMMARY

One or more embodiments of this specification provide a signal transmission method, device and equipment based on drilling equipment, and a medium, which are used for solving the following technical problems:

in the prior art, the signal transmission by drilling equipment through multiple signal lines has the problems that the cost is high, and the pressure bearing capacity of a drill pipe instrument is reduced.

One or more embodiments of this specification adopt the following technical solution:

According to the signal transmission method based on drilling equipment provided by one or more embodiments of this specification, the signal transmission is applied to a signal transmission system of the drilling equipment, the signal transmission system includes a master node and a plurality of slave nodes, the master node communicates with the slave nodes through a 1-wire bus, and the method includes:

sending, by the master node, an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time; and receiving, by the specified slave node, the instruction signal, decoupling the instruction signal to obtain the data request signal, obtaining a reply signal according to the data request signal, coupling the reply signal with the TTL signal to obtain a feedback signal, and sending the feedback signal to the master node.

Furthermore, the TTL signal is a 0-5V square wave signal, the data request signal corresponds to the TTL signal, that is, when the level of the TTL signal is 0V, the data request signal is a signal within a first preset range, when the level of the TTL signal is 5V, the data request signal is a signal within a second preset range, the first preset range is a positive value, the second preset range is a negative value, and the system identifies that the logic level of the instruction signal corresponding to the signal within the first preset range is 0, and the logic level of the instruction signal corresponding to the signal within the second preset range is 1.

Furthermore, the signal within the first preset range is set as urgent request data, and the signal within the second preset range is set as non-urgent request data;

when the master node sends the instruction signal to a specified slave node, if the data request signal is urgent request data, the data request signal is sent at a falling edge of the instruction signal; and if the data request signal is non-urgent request data, the data request signal is sent at a rising edge of the instruction signal.

Further, before sending, by the master node, an instruction signal coupled by a TTL signal and a data request signal to a specified slave node, the method further includes:

setting odd-numbered slave nodes to be used for receiving urgent request data, and even-numbered slave nodes to be used for receiving non-urgent request data;

when the master node sends corresponding instruction signals to a plurality of specified slave nodes, the method further includes:

judging whether odd-numbered slave nodes exist in the plurality of specified slave nodes or not at the rising edge of the instruction signal, if no, sending, by the master node, corresponding instruction signals to the plurality of specified slave nodes; and judging whether even-numbered slave nodes exist in the plurality of specified slave nodes or not at the falling edge of the instruction signal, if no, sending, by the master node, corresponding instruction signals to the plurality of specified slave nodes.

Furthermore, sending the feedback signal to the master node specifically includes:

sending the corresponding feedback signal to the master node in the same period or the next period of the data request signal if the data request signal is the urgent request data and the corresponding feedback signal is the urgent request data; and sending the corresponding feedback signal to the master node in the same period or the next period of the data request signal if the data request signal is the non-urgent request data and the corresponding feedback signal is the non-urgent request data.

Furthermore, when the master node sends corresponding instruction signals to a plurality of specified slave nodes, the method further includes:

sending, by the plurality of specified slave nodes, corresponding feedback signals to the master node in sequence according to the preset priorities of the slave nodes.

Furthermore, the frequency of the TTL signal is set as a first frequency, and the frequency of the data request signal is set as a second frequency;

decoupling the instruction signal specifically includes:

performing FFT (Fast Fourier Transform) on the instruction signal, analyzing the frequencies of the TTL signal and the data request signal in the instruction signal in a frequency domain, and performing IFFT (Inverse Fast Fourier Transform) on the instruction signal to inversely transform the instruction signal from the frequency domain to a time domain to obtain the TTL signal and the data request signal.

One or more embodiments of this specification provide a signal transmission device based on drilling equipment, the signal transmission is applied to a signal transmission system of the drilling equipment, the signal transmission system includes a master node and a plurality of slave nodes, the master node communicates with the plurality of slave nodes through a 1-wire bus, and the device includes:

a signal sending unit, wherein the master node sends an instruction signal coupled by a TTL signal and a data request signal to a specified slave node, and the data request signal is a critical identifiable signal with the same period as the TTL signal so as to ensure that the system can identify the logic level of the instruction signal and occupy the 1-wire bus in real time; and a signal feedback unit, wherein the specified slave node receives the instruction signal, decouples the instruction signal to obtain the data request signal, obtains a reply signal according to the data request signal, couples the reply signal with the TTL signal to obtain a feedback signal, and sends the feedback signal to the master node.

One or more embodiments of this specification provide a signal transmission device based on drilling equipment, the signal transmission is applied to a signal transmission system of the drilling equipment, the signal transmission system includes a master node and a plurality of slave nodes, the master node communicates with the plurality of slave nodes through a 1-wire bus, and the device includes:

at least one processor; and a memory in communication connection with the at least one processor, wherein, the memory stores instructions executable by the at least one processor, and the instructions are executed by the at least one processor to enable the at least one processor to:

send, by the master node, an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time; and receive, by the specified slave node, the instruction signal, decoupling the instruction signal to obtain the data request signal, obtaining a reply signal according to the data request signal, coupling the reply signal with the TTL signal to obtain a feedback signal, and sending the feedback signal to the master node.

One or more embodiments of this specification provide a non-volatile computer storage medium storing computer executable instructions, and the computer executable instructions are set as follows:

signal transmission is applied to a signal transmission system of drilling equipment, the signal transmission system includes a master node and a plurality of slave nodes, and the master node communicates with the slave nodes through a 1-wire bus;

the master node sends an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time;

the specified slave node receives the instruction signal, decouples the instruction signal to obtain the data request signal, obtains a reply signal according to the data request signal, couples the reply signal with the TTL signal to obtain a feedback signal, and sends the feedback signal to the master node.

The above at least one technical solution adopted by the embodiments of this specification can achieve the following beneficial effects: in the signal transmission system of the drilling equipment, the TTL signal and the data request signal are coupled to generate the instruction signal, the instruction signal is a critical identifiable signal, the signal is transmitted through a signal line, a corresponding logic level of the signal can be identified by the system, and in the process, the data request signal is transmitted to a specified slave node through the signal line. Meanwhile, after the specified slave node receives the instruction signal, the instruction signal can be decoupled, a reply signal is obtained according to the decoupled data request signal, then the reply signal and the TTL signal are coupled to obtain a feedback signal, and finally, the feedback signal can be sent to the master node through the same signal line. Therefore, the number of signal lines is reduced, the transmission cost of the drilling equipment is reduced, and the pressure bearing capacity of a drill pipe instrument is indirectly improved.

BRIEF DESCRIPTION OF THE DRAWINGS

In order to more clearly illustrate the technical solutions in the embodiments of this specification or the prior art, the accompanying drawings required for the description of the embodiments or the prior art will be briefly introduced below. Obviously, the accompanying drawings in the following description are only some embodiments described in this specification. For those of ordinary skill in the art, other drawings may also be obtained from these drawings without creative labor. In figures.

DETAILED DESCRIPTION OF THE EMBODIMENTS

The embodiments of this specification provide a signal transmission method, device and equipment based on drilling equipment, and a medium.

A signal transmission system of the drilling equipment involved in the embodiments of this specification may include a ground node, a communication node, a measurement-while-drilling node, a rotary guide node and a drill bit. The nodes communicate with one another through a 1-wire bus.

The bus includes a ground line and a signal line, the ground line is generally replaced by a metal shell, so that synchronous transmission of two paths of signals is realized on one signal line, which is called single-line double-signal transmission, and all nodes on each node network device of the drilling equipment carry signal modulation circuits. The signal characteristics are as follows:

The bus level standard is compatible with TTL (Transistor Transistor Logic), that is, when the input is smaller than $V_L$, low level 0 is output; when the input is larger than $V_H$, high level 1 is output. $V_H$ and $V_L$ are the minimum identifiable levels (i.e. critical identifiable levels). Meanwhile, the bus signal is in a serial port UART format after being demodulated, namely, the bus signal can be in direct communication with the UART of the node on the bus.

The UART transmission interface has two lines: TX and RX. A level signal output by the TX line is sent out after passing through the signal modulation module; and the receiver inputs the demodulated signal into the RX line, so that one-time signal transmission is completed. It needs to be noted that the transmission can only realize half-duplex information transmission, the master node actively sends a signal, and the slave node responds to the master node only after receiving a complete signal packet.

In most cases, TTL type communication adopts a parallel data transmission mode, and parallel data transmission is not suitable for a distance exceeding 10 feet (about 30 meters). This is due to both reliability and cost. The problems of phase deviation and asymmetry exist in a parallel interface, and the problems have influence on the reliability.

Each node of drilling equipment not only needs to identify a TTL signal, but also needs to transmit a data request signal in real time, and in a traditional method, a data signal is transmitted through two signal lines respectively, or a one-to-one question and answer mode (a host occupies a bus to request data, and a bus slave is released to upload data) is adopted. When a one-to-one question and answer mode is applied, if a bus is occupied, it is required to wait for the bus to be idle, so that the data transmission efficiency is reduced, and the problems of deviation and asymmetry exist. However, the reason why the drilling equipment needs to carry out double-path data transmission on one data line is as follows: (1) electrical connection between downhole drill pipe instruments can only depend on a conductive slip ring, and the conductive slip ring does not have multiple signal lines; (2) a plurality of signal lines need through holes, so that the cost of punching the through holes is high; and (3) the strength of a drill collar may be affected by the number of through holes, and a drill pipe instrument cannot bear the downhole high-pressure environment due to increase of the number of drill holes. Therefore, it is very necessary to realize dual-path data transmission on the 1-wire bus. In this way, the data transmission rate can be increased, the defect that the short-distance communication rate is low is overcome, the data transmission cost is reduced, and therefore the communication requirement of drilling equipment is met.

In order to make those skilled in the art better understand the technical solutions in this specification, the technical solutions in the embodiments of this specification will be clearly and completely described below with reference to the accompanying drawings in the embodiments of this specification. Obviously, the described embodiments are only some of the embodiments of this specification, but not all of the embodiments. Based on the embodiments of this specification, all other embodiments obtained by those of ordinary skill in the art without creative efforts shall fall within the protection scope of this specification.

Figure 1:
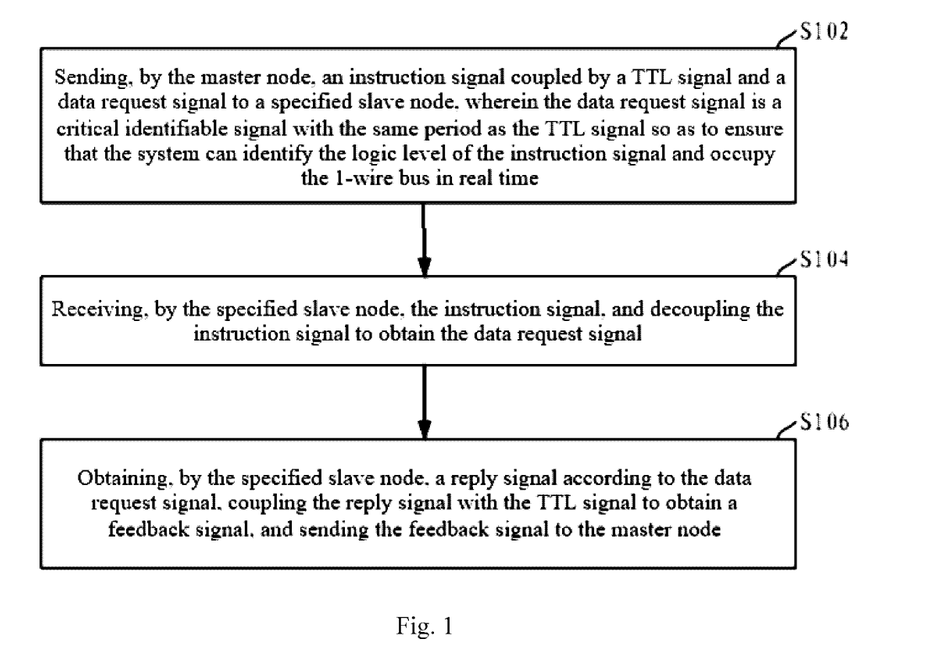
FIG. 1 is a flowchart of a signal transmission method based on drilling equipment provided by one or more embodiments of this specification.

FIG. 1 is a flowchart of a signal transmission method based on drilling equipment provided by one or more embodiments of this specification, the flow can be executed by a signal transmission system applied to the drilling equipment, and the signal transmission system includes a master node and a plurality of slave nodes. The master node communicates with the plurality of slave nodes through a 1-wire bus, and certain input parameters or intermediate results in the process are allowed to be manually intervened and adjusted so as to help to improve the accuracy.

The method provided by the embodiments of this specification includes the following process steps:

S102, sending, by the master node, an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time.

Figure 2:
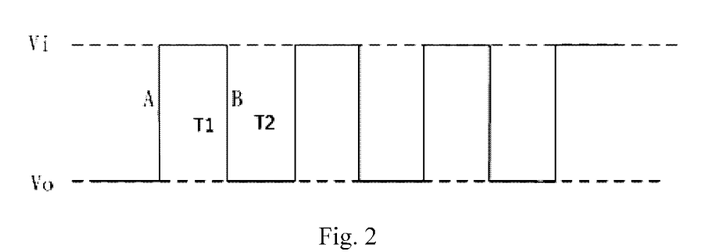
FIG. 2 is a schematic diagram of a TTL signal provided by one or more embodiments of this specification.

In the embodiments of this specification, the TTL signal may be a 0-5V square wave signal, referring to a schematic diagram of the TTL signal shown in FIG. 2, all nodes in the system perform corresponding operation by identifying the TTL signal so as to ensure the normal work of the nodes, in the process, a 1-wire bus of the signal transmission system is occupied in real time, and real-time transmission of a current data request signal is kept.

Figure 3:
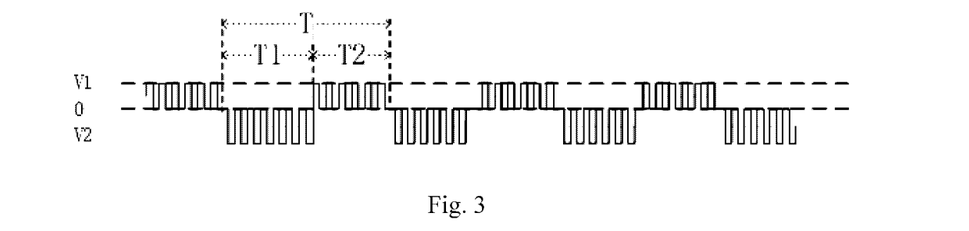
FIG. 3 is a schematic diagram of a data request signal provided by one or more embodiments of this specification.

Meanwhile, the data request signal corresponds to the TTL signal, that is, when the level of the TTL signal is 0, the data request signal is a signal within a first preset range, when the level of the TTL signal is 5V, the data request signal is a signal within a second preset range, the first preset range is a positive value, and the second preset range is a negative value, referring to a schematic diagram of the data request signal shown in FIG. 3, the data request signal in the figure is a negative value at the T1 stage, corresponding to the T1 stage in FIG. 2, and the data request signal in the figure is a positive value at the T2 stage, corresponding to the T2 stage in FIG. 2. The period T of the coupled signal is T1+T2, at the high level phase, T1 is coupled and at the low level phase, T2 is coupled, the amplitude of the data request signal at the T1 phase is V2-0, the amplitude of the data request signal at the T2 phase is 0-V1, |V1|<VL, |V2|<Vi-VH, V0 in FIG. 2 is 0, and T1 and T2 in FIG. 2 and FIG. 3 form the whole period T.

Figure 4:
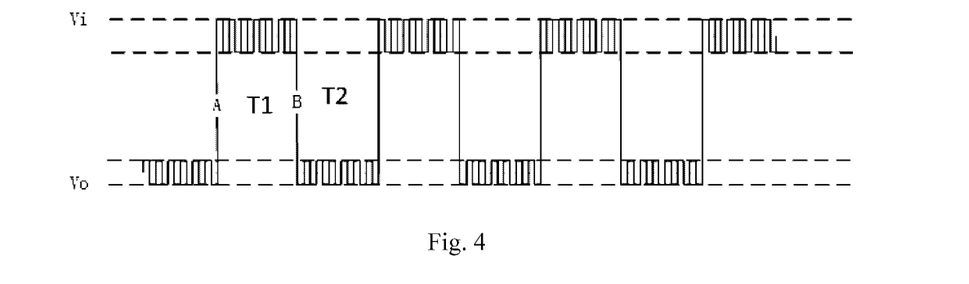
FIG. 4 is a schematic diagram of an instruction signal provided by one or more embodiments of this specification.

After the TTL signal and the data request signal are coupled, referring to a schematic diagram of the instruction signal shown in FIG. 4, the T1 stage in FIG. 2 corresponds to the T1 stage in FIG. 3, the T2 stage in FIG. 2 corresponds to the T2 stage in FIG. 3, and the subsequent stages also correspond to each other. The amplitude of the coupled instruction signal at the low level of the input end is not higher than $V_L$, and the amplitude of the coupled instruction signal at the high level of the input end is not lower than $V_H$. The output end outputs 0 at a low-level stage and outputs 1 at a high-level stage, so that the requirements of the system are met.

It needs to be explained that the T1 stage of the TTL signal is identified as the logic level 1 by the signal transmission system, and the T2 stage of the TTL signal is identified as the logic level 0 by the signal transmission system. After the TTL signal is coupled with the signal within the second preset range (T1 stage), an instruction signal can be identified as a logic level 1 by the signal transmission system, and after the TTL signal is coupled with the signal within the first preset range (T2 stage), an instruction signal can be identified as a logic level 0 by the signal transmission system. The high level of the signal transmission system is identified as $V_H$, that is, the TTL signal and the data request signal are superposed to present the voltage of $V_H$, and at the moment, the high level can be identified; the low level is identified as $V_L$, that is, when the TTL signal and the data request signal are superposed to present the voltage of $V_L$, the low level can also be identified. This shows that the amplitude/jitter of the coupled signal superimposed on the signal level does not exceed the critical identifiable level, which does not affect the correct identification of the logic. Therefore, the normal work of the signal transmission system is not influenced.

Furthermore, the signal within the first preset range may be set as urgent request data, and the signal within the second preset range may be set as non-urgent request data. When the master node sends the instruction signal to a specified slave node, if the data request signal is urgent request data, the data request signal is sent at a falling edge of the instruction signal; and if the data request signal is non-urgent request data, the data is sent at a rising edge of the instruction signal.

It needs to be explained that the levels corresponding to the urgent request data and the non-urgent request data are the signal within the second preset range and the signal within the first preset range respectively, so that the situation that the master node requests the urgent request data and the non-urgent request data at the same time can be avoided, and if the urgent request data and the non-urgent request data are transmitted in sequence, the amplitude of an instruction signal may exceed the identification range of a signal system, so that a logic level 0 or 1 cannot be identified, and finally, a transmission protocol is caused to be wrong.

Furthermore, before the master node sends the instruction signal coupled by the TTL signal and the data request signal to the specified slave node, in order to regulate the sending of the feedback signal to the master node by the slave node in the subsequent process, and avoid the situation that the transmission protocol error is caused by the fact that the feedback signal sent by the slave node exceeds the identifiable logic level, odd-numbered slave nodes may be set for receiving urgent request data, and even-numbered slave nodes may be set for receiving non-urgent request data. In addition, odd-numbered slave nodes may be set for receiving non-urgent request data, and even-numbered slave nodes may be set for receiving urgent request data.

After odd-numbered slave nodes are set to be used for receiving urgent request data and even-numbered slave nodes are set to be used for receiving non-urgent request data, when a master node sends corresponding instruction signals to a plurality of specified slave nodes, whether odd-numbered slave nodes exist in the plurality of specified slave nodes or not is judged at the rising edge of the instruction signal, if no, the master node sends corresponding instruction signals to the plurality of specified slave nodes; if yes, the amplitude of the instruction signal may exceed the identification range of the signal system, and the master node cannot send corresponding instruction signals to the plurality of specified slave nodes. Whether even-numbered slave nodes exist in the plurality of specified slave nodes or not is judged at the falling edge of the instruction signal, if no, the master node sends the corresponding instruction signal to the plurality of specified slave nodes; if yes, the amplitude of the instruction signal may exceed the identification range of the signal system, and the master node cannot send corresponding instruction signals to the plurality of specified slave nodes.

It needs to be explained that the specified slave nodes are the slave nodes of which the master node request data, for example, the slave nodes include a slave node 1, a slave node 2, a slave node 3 and a slave node 4, and if the master node needs to request data of the slave node 1 and the slave node 3, at the moment, the slave node 1 and the slave node 3 are specified slave nodes.

It needs to be explained that in the working process of the signal transmission system, the master node conducts instruction signal transmission on the slave node of drilling equipment according to the real-time requirement. After receiving the instruction signal of the master node, the subsequent corresponding slave nodes make corresponding feedback.

S104, receiving, by the specified slave node, the instruction signal, and decoupling the instruction signal to obtain the data request signal.

In the embodiments of this specification, the frequency of the large-amplitude TTL signal is set as the first frequency, the frequency of the small-amplitude data request signal is set as the second frequency, and the difference between the first frequency and the second frequency may be set, so that the TTL signal and the data request signal are prevented from being superposed together after being coupled through setting of the frequencies, and the subsequent decoupling operation is facilitated.

Decoupling may be performed according to different frequencies of the TTL signal and the data request signal, for example, the frequency of the TTL signal may be 1 k-2 kHz. The frequency of the data request signal may be 10 k-30 kHz. FFT is performed on instruction signal, frequencies of the TTL signal and the data request signal in the instruction signal are analyzed in a frequency domain, and IFFT is performed on the instruction signal to inversely transform the instruction signal from the frequency domain to a time domain, so as to decouple the corresponding TTL signal and data request signal again.

According to the embodiments of this specification, the signal received by the slave node can be amplified, filtered and rectified by a comparator to obtain a unipolar signal, and then the signal demodulation is realized by using a monostable trigger.

S106, obtaining, by the specified slave node, a reply signal according to the data request signal, coupling the reply signal with the TTL signal to obtain a feedback signal, and sending the feedback signal to the master node.

According to the embodiments of this specification, when the feedback signal is sent to the master node, if the data request signal is urgent request data and the corresponding feedback signal is urgent request data, the corresponding feedback signal is sent to the master node in the same period or the next period of the data request signal; and if the data request signal is non-urgent request data and the corresponding feedback signal is non-urgent request data, the corresponding feedback signal is sent to the master node in the same period or the next period of the data request signal. In this process, data of the same type can be sent and received all the time as long as the rising edge and the falling edge do not change. If the rising edge or the falling edge is changed, data of the same type can be sent and received in the next period, and at the moment, data of the same type refers to urgent request data or non-urgent request data.

Furthermore, when the master node in the embodiments of this specification sends the corresponding instruction signals to the plurality of specified slave nodes, the plurality of specified slave nodes can sequentially send the corresponding feedback signals to the master node according to the preset priorities of the slave nodes. At the moment, a plurality of specified slave nodes can meet the setting of odd-numbered and even-numbered slave nodes, for example, the master node sends corresponding instruction signals to the slave node 1 and the slave node 3, and after the slave node 1 and the slave node 3 receive the instruction signals, which slave node firstly occupies the 1-wire bus to send the feedback signal can be determined according to the preset priorities of the slave nodes. At the moment, if the priority of the slave node 1 is higher than that of the slave node 3, the slave node 1 sends a corresponding feedback signal to the master node. The slave node 3 can detect the state of the slave node 1 in real time, and if it is detected that the slave node 1 has completed sending of the feedback signal, the slave node 3 can occupy the 1-wire bus and send the corresponding feedback signal to the master node.

Figure 5:
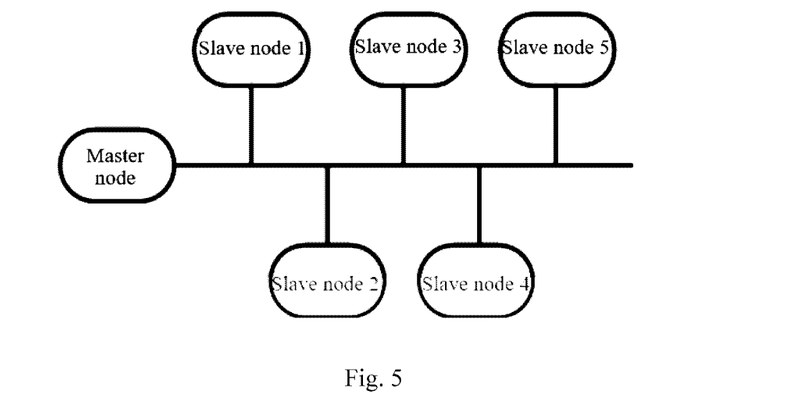
FIG. 5 is a schematic diagram of a master node and a plurality of slave nodes provided by one or more embodiments of this specification.

In the above solution, a schematic diagram of a master node and a plurality of slave nodes may be shown in FIG. 5, which shows the connection relationship between the master node and the slave node 1, the slave node 2, . . . , and the slave node 5.

It needs to be explained that the data is received in a period of time after the master node stops sending the data (the amplitude of the period of time does not fluctuate, and is a square wave signal as shown in FIG. 2). After each slave node receives the coupled instruction signal, the instruction signal is decoupled in real time, a feedback signal is sent to the master node according to the received instruction signal, at the moment, the square wave signal is coupled with the feedback signal, and fluctuation will occur.

It needs to be explained that in order to avoid errors generated by a signal transmission protocol (for example, when the fluctuation amplitude exceeds a critical identifiable level), the slave nodes can be classified into odd-numbered slave nodes and even-numbered slave nodes. For example, the odd-numbered slave nodes (1, 3, 5) receive urgent data, and the even-numbered slave nodes (2, 4, 6) receive non-urgent data, and the urgent data and the non-urgent data (may be set according to the address bit, frequency, amplitude, etc. of the data). At the rising edge, a non-urgent data packet is sent, and at the falling edge, an urgent data packet is sent. In this way, the situation that the host requests the urgent data and the non-urgent data at the same time, and if the urgent data and the non-urgent data are transmitted in sequence, transmission protocol errors may be caused by amplitude and the like. An example of a protocol error caused by incorrect setting is as follows: at a rising edge, a master node sends an instruction for requesting data of a slave node 2 and a slave node 3 (the situation is not allowed due to the fact that it is stipulated that at the rising edge, non-urgent data is sent), and after the slave node 2 and the slave node 3 receive the instruction, the amplitude fluctuations of the two groups of data are different and may possibly exceed a critical amplitude, so that the system logic is not identified, and the protocol is wrong.

Furthermore, in the embodiments of this specification, when the master node sends two groups of data packets after the rising edge, the slave nodes can sequentially upload the data according to the priorities stipulated in advance (for example, the slave nodes are divided into odd-numbered slave nodes P1, P3, P5 . . . and even-numbered slave nodes P2, P4, P6 . . . . The priority of the data received by the odd-numbered slave nodes is stipulated as P1>P3>P5> . . . P2$n$+1; the priority of the data received by the even-numbered slave nodes is stipulated as P2>P4>P6 . . . P2$n$). For example, when the master node needs data of the slave node 2 and the slave node 4 at the same time, and the priority of the slave node 2 is higher than the priority of the slave node 4, the slave node 2 firstly sends data to the master node, then when the slave node 4 detects that no data is uploaded (the judgment method may be that the coupled data does not fluctuate after a period of time, that is, the data is identified to be sent completely, or other judgment methods may be adopted), the data of the slave node 4 is sent.

Furthermore, the coupling mode used in the embodiments of this specification may be as follows:

Two paths of signals (the TTL signal and the data request signal) are digital signals, and the two paths of digital signals need to be converted into an instruction signal matched with characteristics of an inductive coupling channel. The inductive coupling channel may transmit signals for the coil by generating an alternating high frequency electromagnetic field. During the period, any one of binary amplitude shift keying (2ASK), binary frequency shift keying (2FSK) and binary phase shift keying (2PSK) may be adopted, in consideration of the complexity, the physical size and the channel noise characteristic thereof, the embodiments of this specification may adopt OOK in the 2ASK to perform signal coupling, and the 2ASK, the 2FSK and the 2PSK are on-off keying of different types.

Figure 6:
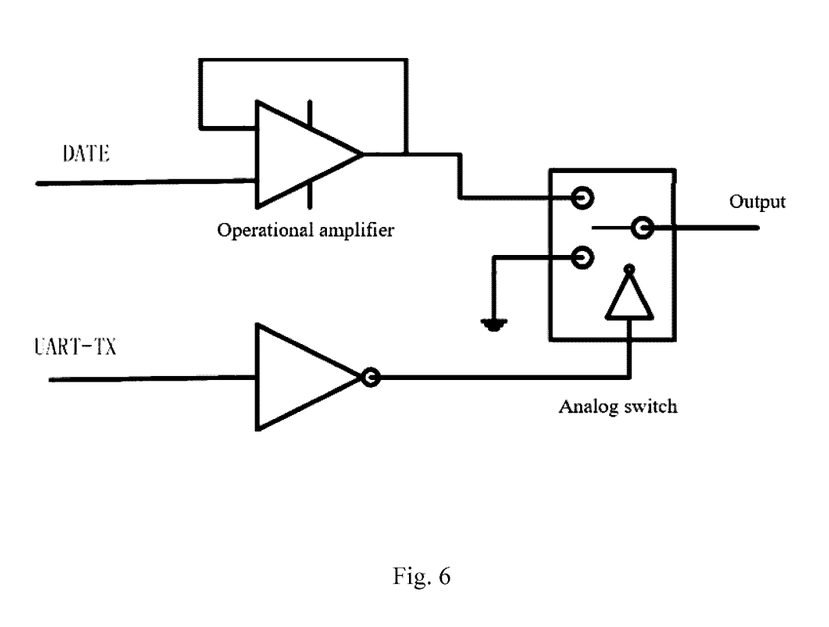
FIG. 6 is a structural schematic diagram of a coupling module provided by one or more embodiments of this specification.

The embodiments of this specification adopt the coupling module to realize signal coupling. A TTL signal and a data request signal are input into two input ends of the coupling module, and the TTL signal and the data request signal are converted into an instruction signal matched with the characteristics of the inductive coupling channel through on-off key controls built in an analog switch in the coupling module. A structural schematic diagram of the coupling module may be shown in FIG. 6. In the figure, DATE represents the input end for the data request signal, UART-TX represents the input end for the TTL signal, and the coupled signal (which may be an instruction signal and a feedback signal) is output after the signals pass through the analog switch.

Figure 7:
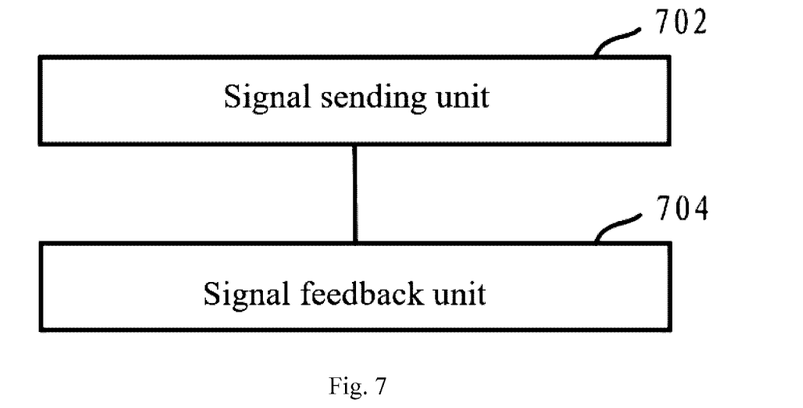
FIG. 7 is a structural schematic diagram of a signal transmission device based on drilling equipment provided by one or more embodiments of this specification.

FIG. 7 is a structural schematic diagram of a signal transmission device based on drilling equipment provided by one or more embodiments of this specification, the signal transmission is applied to a signal transmission system of the drilling equipment, and the signal transmission system includes a master node and a plurality of slave nodes. The master node communicates with the plurality of slave nodes through a 1-wire bus. The device includes a signal sending unit 702 and a signal feedback unit 704.

The signal sending unit 702 sends an instruction signal coupled by a TTL signal and a data request signal to a specified slave node by means of the master node, wherein the data request signal is a critical identifiable signal with the same period as the TTL signal, so that the system can identify the logic level of the instruction signal and occupy the 1-wire bus in real time;

the signal feedback unit 704 receives the instruction signal by means of the specified slave node, decouples the instruction signal to obtain the data request signal, obtains a reply signal according to the data request signal, couples the reply signal with the TTL signal to obtain a feedback signal, and sends the feedback signal to the master node.

Figure 8:
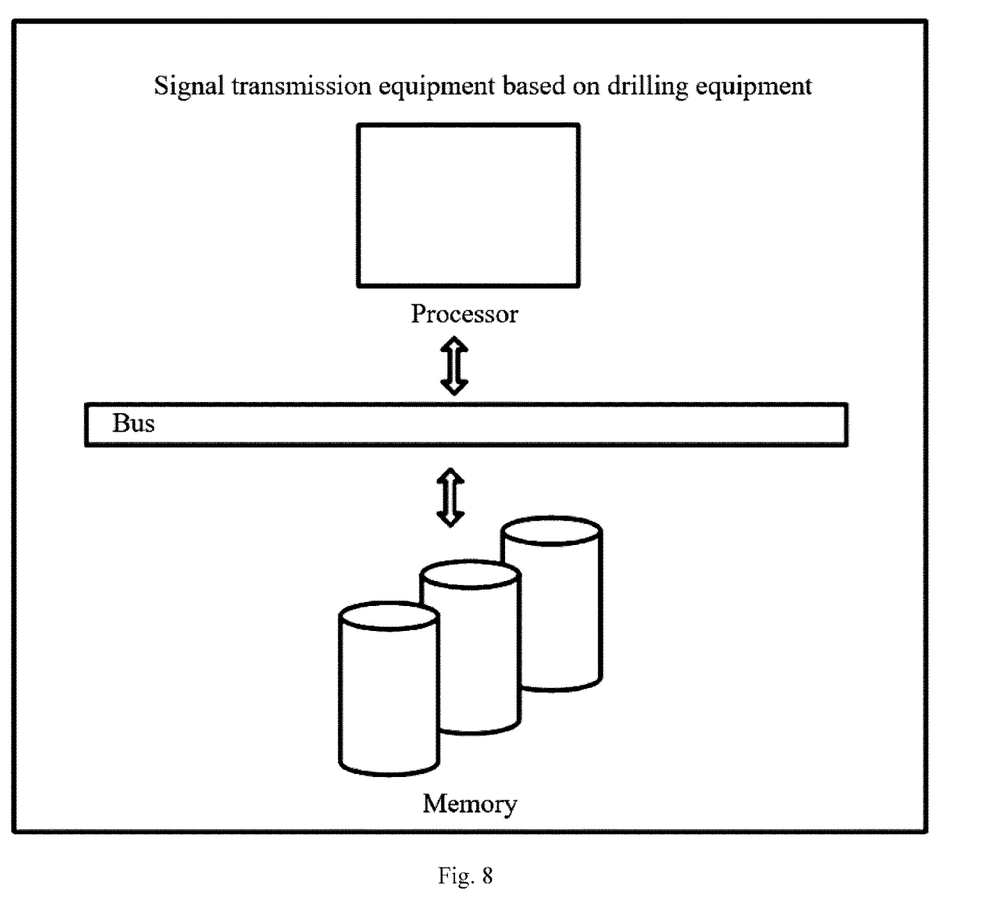
FIG. 8 is a structural schematic diagram of signal transmission equipment based on drilling equipment provided by one or more embodiments of this specification.

FIG. 8 is a structural schematic diagram of signal transmission equipment based on drilling equipment provided by one or more embodiments of this specification, the signal transmission is applied to a signal transmission system of the drilling equipment, and the signal transmission system includes a master node and a plurality of slave nodes. The master node communicates with the plurality of slave nodes through a 1-wire bus. The equipment includes:

at least one processor; and a memory in communication connection with the at least one processor, wherein, the memory stores instructions executable by the at least one processor, and the instructions are executed by the at least one processor to enable the at least one processor to:

send, by the master node, an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time; and receive, by the specified slave node, the instruction signal, decouple the instruction signal to obtain the data request signal, obtain a reply signal according to the data request signal, couple the reply signal with the TTL signal to obtain a feedback signal, and send the feedback signal to the master node.

One or more embodiments of this specification provide a non-volatile computer storage medium storing computer executable instructions, and the computer executable instructions are set as follows:

signal transmission is applied to a signal transmission system of drilling equipment, the signal transmission system includes a master node and a plurality of slave nodes, and the master node communicates with the slave nodes through a 1-wire bus;

the master node sends an instruction signal coupled by a TTL signal and a data request signal to a specified slave node, wherein the data request signal is a critical identifiable signal with the same period as the TTL signal so as to ensure that the system can identify the logic level of the instruction signal and occupy the 1-wire bus in real time;

the specified slave node receives the instruction signal, decouples the instruction signal to obtain the data request signal, obtains a reply signal according to the data request signal, couples the reply signal with the TTL signal to obtain a feedback signal, and sends the feedback signal to the master node.

The various embodiments in the description are described in a progressive manner, and the same and similar parts between the various embodiments may be referred to each other, and each embodiment focuses on the differences from other embodiments. In particular, for the apparatus, equipment, and non-volatile computer storage medium embodiments, since they are basically similar to the method embodiments, the description is relatively simple, and reference may be made to some descriptions of the method embodiments for related parts.

The specific embodiments of this specification have been described above. Other embodiments are within the scope of the appended claims. In some cases, the actions or steps recited in the claims can be performed in an order different from that in the embodiments and still achieve desirable results. Additionally, the processes depicted in the figures do not necessarily require the particular order shown, or sequential order, to achieve desirable results. In some embodiments, multitasking and parallel processing are also possible or may be advantageous.

The above embodiments are merely one or more embodiments of this specification, and are not intended to limit this specification. Various modifications and variations of the one or more embodiments of this specification are possible for those skilled in the art. Any modification, equivalent replacement, improvement, etc. made within the spirit and principle of one or more embodiments of this specification should be included within the scope of the claims of this specification.

What is claimed is:

1. A signal transmission method based on drilling equipment, wherein the signal transmission is applied to a signal transmission system of the drilling equipment, the signal transmission system comprises a master node and a plurality of slave nodes, the master node communicates with the plurality of slave nodes through a 1-wire bus, and the method comprises:

sending, by the master node, an instruction signal coupled by a TTL (transistor transistor logic) signal and a data request signal to a specified slave node, wherein the data request signal is a critical identifiable signal with the same period as the TTL signal so as to ensure that the system can identify the logic level of the instruction signal and occupy the 1-wire bus in real time; and receiving, by the specified slave node, the instruction signal, decoupling the instruction signal to obtain the data request signal, obtaining a reply signal according to the data request signal, coupling the reply signal with the TTL signal to obtain a feedback signal, and sending the feedback signal to the master node.

2. The method according to claim 1, wherein the TTL signal is a 0-5V square wave signal, the data request signal corresponds to the TTL signal, that is, when the level of the TTL signal is 0V, the data request signal is a signal within a first preset range, when the level of the TTL signal is 5V, the data request signal is a signal within a second preset range, the first preset range is a positive value, the second preset range is a negative value, and the system identifies that the logic level of the instruction signal corresponding to the signal within the first preset range is 0, and the logic level of the instruction signal corresponding to the signal within the second preset range is 1.

3. The method according to claim 2, wherein the signal within the first preset range is set as urgent request data, and the signal within the second preset range is set as non-urgent request data;

when the master node sends the instruction signal to a specified slave node, under the condition that the data request signal is urgent request data, the data request signal is sent at a falling edge of the instruction signal; and under the condition that the data request signal is non-urgent request data, the data request signal is sent at a rising edge of the instruction signal.

4. The method according to claim 3, wherein before sending, by the master node, an instruction signal coupled by a TTL signal and a data request signal to a specified slave node, the method further comprises:

setting odd-numbered slave nodes to be used for receiving urgent request data, and even-numbered slave nodes to be used for receiving non-urgent request data;

when the master node sends corresponding instruction signals to a plurality of specified slave nodes, the method further comprises:

judging whether odd-numbered slave nodes exist in the plurality of specified slave nodes or not at the rising edge of the instruction signal, if no, sending, by the master node, corresponding instruction signals to the plurality of specified slave nodes; and judging whether even-numbered slave nodes exist in the plurality of specified slave nodes or not at the falling edge of the instruction signal, if no, sending, by the master node, corresponding instruction signals to the plurality of specified slave nodes.

5. The method according to claim 3, wherein sending the feedback signal to the master node specifically comprises:
sending the corresponding feedback signal to the master node in the same period or the next period of the data request signal under the condition that the data request signal is urgent request data and the corresponding feedback signal is urgent request data; and
sending the corresponding feedback signal to the master node in the same period or the next period of the data request signal under the condition that the data request signal is non-urgent request data and the corresponding feedback signal is non-urgent request data.

6. The method according to claim 1, wherein when the master node sends corresponding instruction signals to a plurality of specified slave nodes, the method further comprises:
sending, by the plurality of specified slave nodes, corresponding feedback signals to the master node in sequence according to preset priorities of the slave nodes.

7. The method according to claim 1, wherein coupling the TTL signal and the data request signal into an instruction signal specifically comprises:
inputting the TTL signal and the data request signal into two input ends of a coupling module, and converting the TTL signal and the data request signal into an instruction signal matched with characteristics of an inductive coupling channel through on-off key controls built in an analog switch in the coupling module.

8. The method according to claim 1, wherein the frequency of the TTL signal is set as a first frequency, and the frequency of the data request signal is set as a second frequency;
decoupling the instruction signal specifically comprises:
performing FFT on the instruction signal, analyzing the frequencies of the TTL signal and the data request signal in the instruction signal in a frequency domain, and performing IFFT on the instruction signal to inversely transform the instruction signal from the frequency domain to a time domain to obtain the TTL signal and the data request signal.

9. Signal transmission equipment based on drilling equipment, wherein the signal transmission is applied to a signal transmission system of the drilling equipment, the signal transmission system comprises a master node and a plurality of slave nodes, the master node communicates with the slave nodes through a 1-wire bus, and the signal transmission equipment comprises:
at least one processor; and
a memory in communication connection with the at least one processor, wherein,
the memory stores instructions executable by the at least one processor, and the instructions are executed by the at least one processor to enable the at least one processor to:
send, by the master node, an instruction signal coupled by a TTL (transistor transistor logic) signal and a data request signal to a specified slave node, wherein the data request signal is a critical identifiable signal with the same period as the TTL signal so as to ensure that the system can identify the logic level of the instruction signal and occupy the 1-wire bus in real time; and
receive, by the specified slave node, the instruction signal, decouple the instruction signal to obtain the data request signal, obtain a reply signal according to the data request signal, couple the reply signal with the TTL signal to obtain a feedback signal, and send the feedback signal to the master node.

10. A non-volatile computer storage medium storing computer executable instructions, wherein the computer executable instructions are set as follows:
signal transmission is applied to a signal transmission system of drilling equipment, the signal transmission system comprises a master node and a plurality of slave nodes, and the master node communicates with the slave nodes through a 1-wire bus;
the master node sends an instruction signal coupled by a TTL (transistor transistor logic) signal and a data request signal to a specified slave node, wherein the data request signal is a critical identifiable signal with the same period as the TTL signal so as to ensure that the system can identify the logic level of the instruction signal and occupy the 1-wire bus in real time;
the specified slave node receives the instruction signal, decouples the instruction signal to obtain the data request signal, obtains a reply signal according to the data request signal, couples the reply signal with the TTL signal to obtain a feedback signal, and sends the feedback signal to the master node.

* * * * *